(12) United States Patent
Yoshida

(10) Patent No.: US 12,504,938 B2
(45) Date of Patent: Dec. 23, 2025

(54) DISPLAY CONTROL SYSTEM, DISPLAY METHOD, AND STORAGE MEDIUM

(71) Applicant: Panasonic Intellectual Property Management Co., Ltd., Osaka (JP)

(72) Inventor: Tadashi Yoshida, Osaka (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 174 days.

(21) Appl. No.: 18/373,053

(22) Filed: Sep. 26, 2023

(65) Prior Publication Data

US 2024/0012603 A1    Jan. 11, 2024

Related U.S. Application Data

(63) Continuation of application No. PCT/JP2022/003422, filed on Jan. 28, 2022.

(30) Foreign Application Priority Data

Mar. 31, 2021  (JP) .................................. 2021-060039

(51) Int. Cl.
*G06F 3/14* (2006.01)
*B60K 35/10* (2024.01)
(Continued)

(52) U.S. Cl.
CPC ............ *G06F 3/1446* (2013.01); *B60K 35/10* (2024.01); *B60K 35/22* (2024.01); *B60K 35/81* (2024.01);
(Continued)

(58) Field of Classification Search
None
See application file for complete search history.

(56) References Cited

U.S. PATENT DOCUMENTS

| | | | |
|---|---|---|---|
| 5,668,569 A * | 9/1997 | Greene | G09F 9/3026 |
| | | | 345/903 |
| 2002/0167460 A1* | 11/2002 | Baudisch | H04N 9/12 |
| | | | 348/E9.012 |

(Continued)

FOREIGN PATENT DOCUMENTS

| | | |
|---|---|---|
| JP | 2007-010978 A | 1/2007 |
| JP | 2009-069310 A | 4/2009 |

(Continued)

OTHER PUBLICATIONS

Office Action for related Japanese patent application No. 2021-060039, dated May 28, 2024, along with an English translation thereof.

(Continued)

*Primary Examiner* — Haixia Du
(74) *Attorney, Agent, or Firm* — Greenblum & Bernstein, P.L.C.

(57) ABSTRACT

A display control system includes an obtainer that obtains display device information on each of display devices, a calculator that calculates a correction value corresponding to each of the display devices, on the basis of the display device information, and a display that generates an image to be displayed across two or more display devices among the display devices. The display corrects the image to be displayed across the two or more display devices, on the basis of the correction value corresponding to each of the two or more display devices, and displays, across the two or more display devices, the image corrected.

10 Claims, 7 Drawing Sheets

(51) Int. Cl.
*B60K 35/22* (2024.01)
*B60K 35/28* (2024.01)
*B60K 35/29* (2024.01)
*B60K 35/81* (2024.01)
*B60W 60/00* (2020.01)
*G09G 5/00* (2006.01)

(52) U.S. Cl.
CPC ............... *G09G 5/00* (2013.01); *B60K 35/28* (2024.01); *B60K 35/29* (2024.01); *B60K 2360/167* (2024.01); *B60K 2360/175* (2024.01); *B60K 2360/182* (2024.01); *B60K 2360/349* (2024.01); *B60W 60/005* (2020.02); *G09G 2300/026* (2013.01); *G09G 2320/0626* (2013.01); *G09G 2340/045* (2013.01); *G09G 2360/144* (2013.01); *G09G 2380/10* (2013.01)

(56) References Cited

U.S. PATENT DOCUMENTS

| | | |
|---|---|---|
| 2007/0013645 A1 | 1/2007 | Baba |
| 2011/0109526 A1 | 5/2011 | Bauza et al. |
| 2016/0311323 A1* | 10/2016 | Lee ................... B60K 35/10 |
| 2016/0335039 A1* | 11/2016 | Cho ................... G06F 3/1446 |
| 2017/0132480 A1* | 5/2017 | Han ................... B60K 35/00 |
| 2019/0009796 A1 | 1/2019 | Fujii et al. |
| 2020/0114763 A1* | 4/2020 | Eom ................... B60K 35/55 |
| 2020/0135127 A1* | 4/2020 | Jung ................... G09G 5/10 |
| 2020/0249899 A1 | 8/2020 | Higuchi et al. |
| 2020/0327868 A1 | 10/2020 | Ezaki |

FOREIGN PATENT DOCUMENTS

| | | |
|---|---|---|
| JP | 2009-216809 A | 9/2009 |
| JP | 5998348 B2 | 9/2016 |
| JP | 2017-187758 A | 10/2017 |
| JP | 2018-036451 A | 3/2018 |
| JP | 2018-116633 A | 7/2018 |
| JP | 2019-015801 A | 1/2019 |
| JP | 2020-126318 A | 8/2020 |
| JP | 2020-173686 A | 10/2020 |

OTHER PUBLICATIONS

International Search Report issued WIPO Patent Application No. PCT/JP2022/003422, dated Apr. 12, 2022, along with an English translation thereof.

Office Action for related Japanese patent application No. 2021-060039, dated Feb. 20, 2024, along with an English translation thereof.

Office Action for related Japanese patent application No. 2021-060039, dated Aug. 27, 2024, along with an English translation thereof.

\* cited by examiner

DISPLAY CONTROL SYSTEM, DISPLAY METHOD, AND STORAGE MEDIUM

CROSS REFERENCE TO RELATED APPLICATIONS

This is a continuation application of PCT International Application No. PCT/JP2022/003422 filed on Jan. 28, 2022, designating the United States of America, which is based on and claims priority of Japanese Patent Application No. 2021-060039 filed on Mar. 31, 2021.

FIELD

The present disclosure relates to a display control system, a display method, and a storage medium.

BACKGROUND

Patent Literature 1 (PTL 1) discloses a display control system that controls display devices. The display control system includes the display devices provided inside a vehicle and a display controller that performs adjustment to display, on the display devices, characters whose sizes are unified among the display devices according to the distance from the head of a driver to each of the display devices.

CITATION LIST

Patent Literature

PTL 1: Japanese Patent No. 5998348

SUMMARY

However, the display control system disclosed in PTL 1 can be improved upon.

A display control system, a display method, and a storage medium according to aspects of the present disclosure are capable of improving upon the above related art.

A display control system according to one aspect of the present disclosure includes an obtainer that obtains display device information on each of display devices, a calculator that calculates a correction value corresponding to each of the display devices, on the basis of the display device information, and a display that generates an image to be displayed across two or more display devices among the display devices. The display corrects the image to be displayed across the two or more display devices, on the basis of the correction value corresponding to each of the two or more display devices, and displays, across the two or more display devices, the image corrected.

It should be noted that general or specific aspects may be realized as a system, a method, an integrated circuit, a computer program, or a computer-readable recording medium such as a CD-ROM, or by any given combination thereof.

A display control system according to one aspect of the present disclosure and the others described below are capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENT

Figure 1:
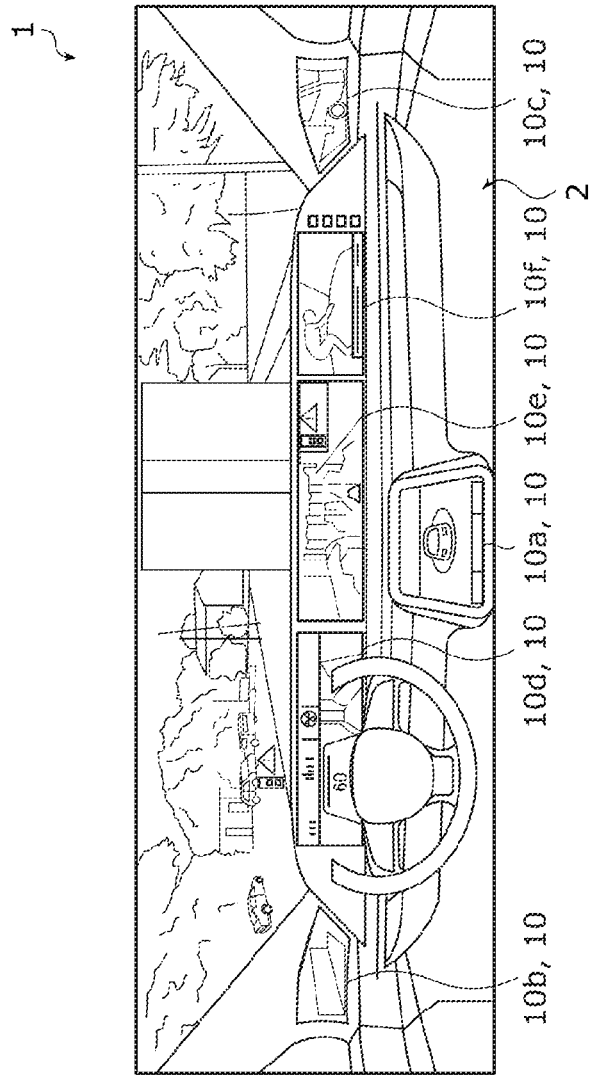
FIG. 1 illustrates an example of an occupant compartment on which a display control system according to an embodiment is mounted.

An embodiment of the present disclosure is described below with reference to the drawings. The embodiment described below shows a specific example of the present disclosure. Thus, the numerical values, shapes, materials, structural elements, arrangement and connection of the structural elements, etc., indicated in the following embodiment are mere examples, and therefore do not intend to limit the present disclosure. Accordingly, among structural elements described in the following embodiments, those not recited in any of the independent claims are described as optional structural elements.

The drawings are schematic views and are not necessarily precise illustrations. In the drawings, identical structural elements are assigned the same reference symbol.

An embodiment is specifically described below with reference to the drawings.

Embodiment

<Configuration: Display Control System 1>

Figure 2:
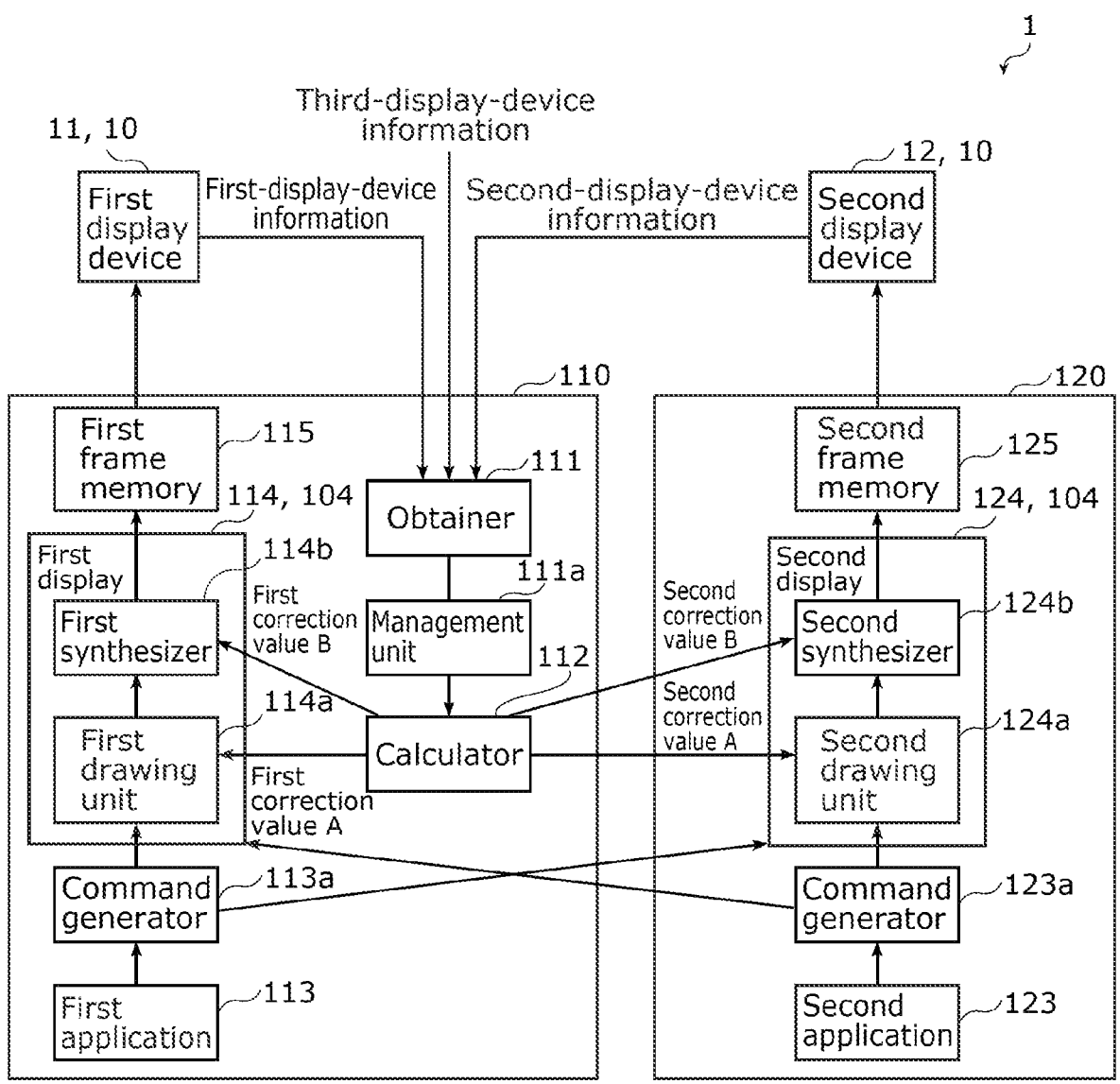
FIG. 2 is a block diagram illustrating a configuration example of the display control system according to the embodiment.

FIG. 1 illustrates an example of an occupant compartment in which display control system 1 according to an embodiment is provided. FIG. 2 is a block diagram illustrating a configuration example of display control system 1 according to the embodiment.

As illustrated in FIGS. 1 and 2, display control system 1 controls, in a linked manner, all display devices 10 or two or more display devices 10 out of physically separated display devices 10 to cause all display devices 10 or two or more display devices 10 to display an image. Display control system 1 can control display devices 10 individually. Here, the images are, for example, a movie and still images.

Display control system 1 is mounted on a traveling object such as vehicle 2. In the embodiment, display control system 1 mounted on vehicle 2 is described. Display control system 1 includes display devices 10 and controllers.

Display devices 10 are display devices such as a car navigation system, an electron mirror system, multi-information displays, and a head up display (HUD) which are mounted on vehicle 2. In the embodiment, as examples of display devices 10, car navigation system 10a disposed in the middle of the breadth of the vehicle, an electron mirror system functioning as left sideview mirror 10b and right sideview mirror 10c, and multi-information displays 10d, 10e, and 10f are provided. Display devices 10 are aligned to enable an occupant of vehicle 2 to look at display devices 10 all at once. In the embodiment, display devices 10 are aligned in the breadth direction of the vehicle. Occupants are people in vehicle 2 and include a driver and a person other than the driver.

Display devices 10 display images including various driving assistance information items to the occupants. The various driving assistance information items include, for example, navigation information, a captured image, vehicle speed information, pedestrian information, nearby-vehicle information, lane departure information, and vehicle condition information. The navigation information is information for providing the driver with, for example, route guidance that shows the route from the present location of vehicle 2 to a destination, while the driver is driving vehicle 2. The captured image is an image of at least a portion of the surroundings of vehicle 2 or at least a portion of the interior of the occupant compartment of vehicle 2, captured by an image capturing device mounted on vehicle 2. The vehicle speed information indicates the traveling speed of vehicle 2. The pedestrian information indicates, for example, whether a pedestrian is present around vehicle 2, the number of pedestrians, and the distance from vehicle 2 to a pedestrian. The nearby-vehicle information indicates, for example, whether another vehicle is present around vehicle 2, the number of other vehicles, the traveling speed of another vehicle, and the distance from vehicle 2 to another vehicle. The lane departure information indicates, for example, whether vehicle 2 departed from a lane (went off the lane). The vehicle condition information indicates, for example, the distance traveled by vehicle 2, the model, fuel consumption, and the type of fuel.

By display control system 1 controlling, in a linked manner, two or more display devices 10 among display devices 10, two or more display devices 10 can each display the same image or a different image. Two or more display devices 10 are next to or adjacent to each other. In FIG. 2 in the embodiment, two or more display devices 10 among display devices 10 include first display device 11 and second display device 12. At least one of, for example, the model, the performance (e.g., a resolution, a response speed, and a contrast ratio), the size of a display screen, and the settings differs between first display device 11 and second display device 12. Controllers control, in a linked manner, two or more display devices among display devices 10. Thus, even if at least one of the physical size, the resolution, the luminance, and the color tone differs between two or more display devices 10, the controllers can cause two or more display devices 10 to display images having an overall sense of unity.

As described above, each of the controllers generates an image to be displayed across two or more display devices 10 among display devices 10.

The controllers are designed to write, to frame memory, an image to be displayed across display devices 10. The frame memory is virtual memory which is set to have a continuous memory area by, for example, an operating system (OS) using one or more physical memories (non-transitory recording media).

The controller is a computer system including a processor and memory. The functions of the controller are achieved by the processor of the computer system executing a program stored in the memory of the computer system. The program may be pre-stored in the memory, provided via a communication line, such the Internet, or provided in a state in which the program is stored in a recording medium, such as a memory card.

As illustrated in FIG. 2 in the embodiment, the controllers include first controller 110 corresponding to first display device 11 and second controller 120 corresponding to second display device 12. Each of first controller 110 and second controller 120 includes, as a main part, an electronic control unit (ECU) that includes a central processing unit (CPU) and a graphics processing unit (GPU). The GPUs of first controller 110 and second controller 120 can, for example, perform drawing processing that complies with Open Graphics Library (OpenGL).

First controller 110 is communicably connected to first display device 11, second display device 12, and second controller 120. For instance, first controller 110 obtains first-display-device information from first display device 11, outputs an image to first display device 11, transmits a correction value to second controller 120, and obtains second-display-device information directly from second display device 12 or via second controller 120.

A controller includes obtainer 111, management unit 111a, calculator 112, an application, display 104, and frame memory. As illustrated in FIG. 2 in the embodiment, first controller 110 includes obtainer 111, management unit 111a, calculator 112, first application 113, command generator 113a, first display 114, and first frame memory 115. In addition, second controller 120 includes second application 123, command generator 123a, second display 124, and second frame memory 125.

Obtainer 111 obtains display device information on each of display devices 10. That is, obtainer 111 obtains the display device information automatically from each of display devices 10 or by the display device information being externally input. Here, the display device information includes at least one of the physical size, resolution, luminance, and color tone of display device 10.

For instance, obtainer 111 is communicably connected to display devices 10. By requesting each of display devices 10 to output the display device information, obtainer 111 automatically obtains the display device information from each of display devices (the first-display-device information and the second-display-device information in FIG. 2). As external input, by an occupant inputting the display device information on display device 10 (third-display-device information in FIG. 2) via a manipulation and input unit (not illustrated), obtainer 111 can obtain display device information on display device 10.

In addition, obtainer 111 obtains an externally input correspondence between the drawing areas of display devices 10. Here, the correspondence between the drawing areas of display devices 10 represents a positional and size relationship between the drawing area of the display screen of first display device 11 and the drawing area of the display screen of second display device 12 when compared in the same display coordinate system.

Obtainer 111 outputs, to management unit 111a, the obtained display device information on each of display devices 10 and the obtained correspondence between the drawing areas of the display devices.

Management unit 111a manages the display device information on each of display devices 10 and the correspondence between the drawing areas of display devices 10, which have been output from obtainer 111, and the display positions, sizes, and display priority levels of application windows, and outputs the information items to calculator 112. Here, the display priority levels are values showing which one of the application windows is preferentially displayed when the application windows are displayed simultaneously. When the application windows are displayed simultaneously, an application window given a higher priority is displayed in front of the other application windows. In addition, the information items managed by management unit 111a are stored in storage (not illustrated). The storage is a recording medium (a storage medium), such as memory or a hard disk, for temporarily storing the display device information on each display device.

Calculator 112 obtains, from management unit 111a, the information items including the display device information on each of display devices 10, the correspondence between the drawing areas of display devices 10, and the display positions, sizes, and display priority levels of the application windows. Calculator 112 calculates a correction value corresponding to each of display devices 10 on the basis of the obtained information items. Calculator 112 calculates the correction value to prevent a difference from appearing between portions of the image when the image is displayed across two or more display devices 10, the portions of the image each being displayed on a different one of two or more display devices 10. In the embodiment, calculator 112 calculates a correction value corresponding to each of first display device 11 and second display device 12 to reduce display differences and cause display devices 10 to have an overall sense of unity when an application or applications are displayed across first display device 11 and second display device 12. Here, the differences are caused due to differences between display devices 10 in terms of, for example, the physical size, resolution, luminance, and color tone of the display device which are indicated in the display device information. Specifically, calculator 112 calculates a first correction value corresponding to first display device 11 on the basis of the display device information on each of first display device 11 and second display device 12. Calculator 112 calculates a second correction value corresponding to second display device 12 on the basis of the display device information on each of first display device 11 and second display device 12. Here, the correction value is an adjustment value to prevent, for example, a physical size difference, a resolution difference, a luminance difference, and a color tone difference between first display device 11 and second display device 12 from appearing when the image is displayed across first display device 11 and second display device 12. In the embodiment, the correction value is categorized into correction value A for correcting differences in the luminance and color tone and correction value B for correcting differences in the size and resolution.

Calculator 112 outputs the calculated correction values to displays 104 of first controller 110 and second controller 120. Specifically, calculator 112 outputs the calculated first correction value to first display 114 of first controller 110 and outputs the calculated second correction value to second display 124 of second controller 120.

More specifically, calculator 112 calculates first correction value A on first controller 110 side for preventing differences in the luminance and color tone from appearing between first display device 11 and second display device 12, and then outputs calculated first correction value A to first drawing unit 114a. Moreover, calculator 112 calculates second correction value A on second controller 120 side for preventing differences in the luminance and color tone from appearing between first display device 11 and second display device 12, and then outputs calculated second correction value A to second drawing unit 124a. Calculator 112 calculates first correction value B on first controller 110 side for preventing differences in the size and resolution from appearing between first display device 11 and second display device 12, and then outputs calculated first correction value B to first synthesizer 114b. Here, first correction value B indicates the corrected display positions and sizes of the application windows. Moreover, calculator 112 calculates second correction value B on second controller 120 side in the same manner as first correction value B is calculated, and then outputs calculated second correction value B to second synthesizer 124b.

Here, first correction value A and second correction value A are uniquely determined for each display device. However, first correction value B and second correction value B need to be recalculated according to the change in the position and size of an application window.

Display 104 corrects images to be displayed on two or more display devices 10 on the basis of the correction values corresponding to each of two or more display devices 10. First display 114 includes first drawing unit 114a and first synthesizer 114b. Second display 124 includes second drawing unit 124a and second synthesizer 124b.

On first controller 110 side, specifically, first drawing unit 114a of first display 114 obtains a draw command for drawing first application 113, generated by command generator 113a and a draw command for drawing second application 123, generated by command generator 123a. On the basis of the draw commands obtained from command generator 113a and command generator 123a and first correction value A obtained from calculator 112, first drawing unit 114a performs drawing processing for adjusting, for example, the luminance (lightness), the contrast, the gamma value, and the color tone. Here, the draw commands are commands for causing the GPU to perform the drawing processing and write to (store into) the frame memory.

Here, in first controller 110, first application 113 operates on the OS of the ECU as hardware. First application 113 is included in the applications.

Here, command generator 113a generates, by first application 113 operating, a draw command for causing first display 114 and second display 124 to perform the drawing processing and outputs the generated draw command to first display 114 and second display 124.

First synthesizer 114b of first display 114 performs cutout of application windows drawn by first drawing unit 114a and synthesis processing, in accordance with first correction value B output by calculator 112 and the display priority levels. Then, first synthesizer 114b outputs, to first frame memory 115, a first image to be displayed on first display device 11.

On second controller 120 side, specifically, second drawing unit 124a of second display 124 obtains the draw command for drawing first application 113, generated by command generator 113a and the draw command for drawing second application 123, generated by command generator 123a. On the basis of the draw commands obtained from command generator 113a and command generator 123a and second correction value A obtained from calculator 112, second drawing unit 124a performs the drawing processing for adjusting, for example, the luminance (lightness), the contrast, the gamma value, and the color tone.

Here, in second controller 120, second application 123 operates on the OS of the ECU as hardware. Second application 123 is also included in the applications.

Here, command generator 123a generates, by second application 123 operating, a draw command for causing first display 114 and second display 124 to perform the drawing processing and outputs the generated draw command to first display 114 and second display 124.

Second synthesizer 124b of second display 124 performs cutout of application windows drawn by second drawing unit 124a and synthesis processing, in accordance with second correction value B output by calculator 112 and the display priority levels. Then, second synthesizer 124b outputs, to second frame memory 125, a second image to be displayed on second display device 12.

Images generated by display 104 and to be displayed on the display screens of display devices 10 are written to the frame memory. As illustrated in FIG. 2 in the embodiment, the frame memory includes first frame memory 115 corresponding to first display device 11 and second frame memory 125 corresponding to second display device 12.

First frame memory 115 is a frame buffer for storing the display content of the first image to be displayed on the display screen of first display device 11. The first image which has been corrected by first display 114 performing the drawing processing and the synthesis processing is written to first frame memory 115. First frame memory 115 may be dedicated memory or part of the memory of the computer system. The first image stored in first frame memory 115 is output to and displayed on first display device 11.

Second frame memory 125 is a frame buffer for storing the display content of the second image to be displayed on the display screen of second display device 12. The second image which has been corrected by second display 124 performing the drawing processing and the synthesis processing is written to second frame memory 125. Second frame memory 125 may also be dedicated memory or part of the memory of the computer system. The second image stored in second frame memory 125 is output to and displayed on second display device 12.

Thus, first controller 110 and second controller 120 can display the corrected image across two or more display devices 10. Specifically, first controller 110 causes first display device 11 to display the corrected first image. Second controller 120 causes second display device 12 to display the corrected second image. Thus, display control system 1 displays images having an overall sense of unity as if two or more display devices 10 were, in their entirety, one display device 10.

<Processing Operation>

Processing operation of display control system 1, a display method, and a program according to the embodiment is described below with reference to FIG. 3.

Figure 3:
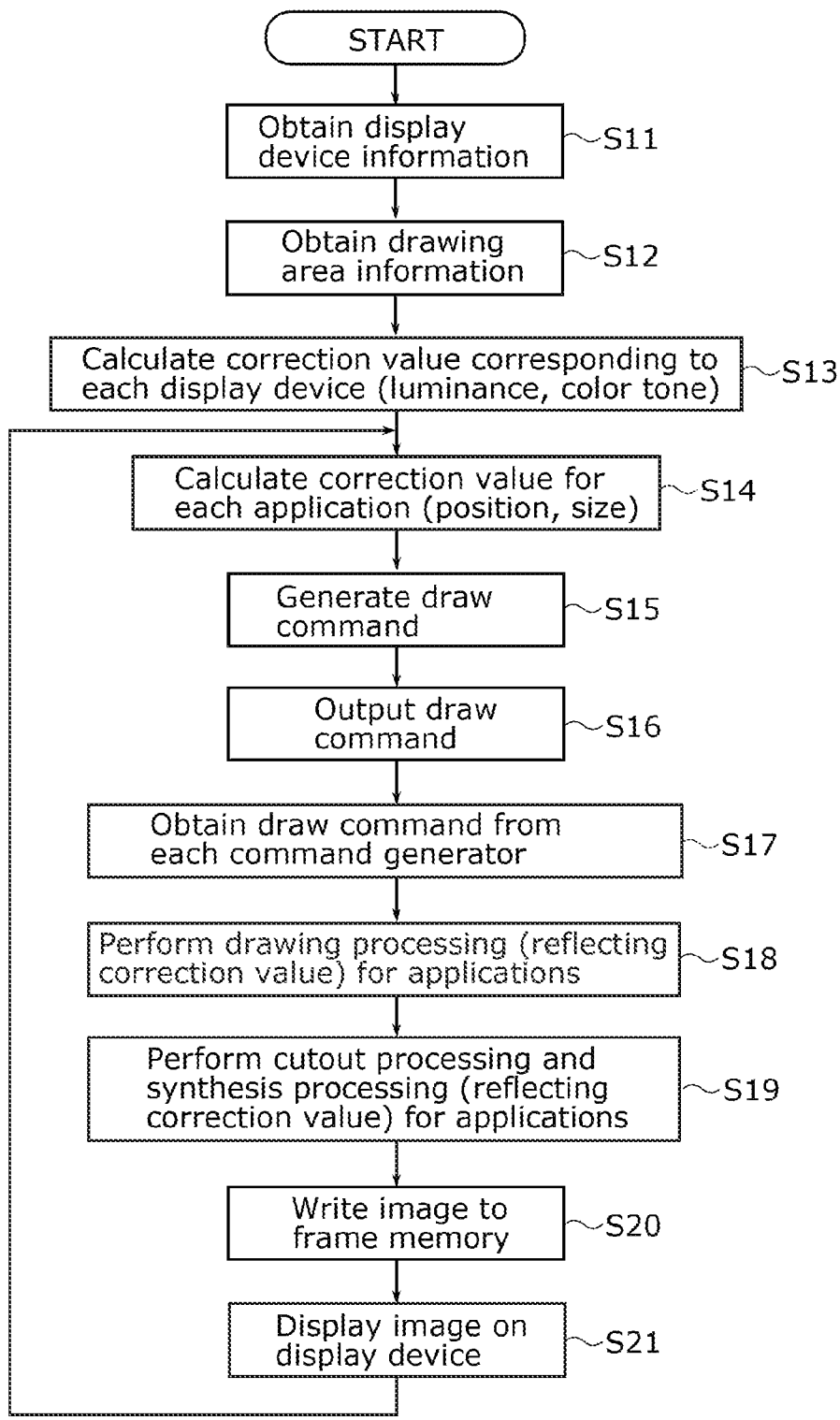
FIG. 3 is a flowchart illustrating processing operation of the display control system according to the embodiment.

FIG. 3 is a flowchart illustrating processing operation of display control system 1 according to the embodiment.

Obtainer 111 obtains the display device information automatically from each of display devices 10 or by the display device information being externally input (S11).

In addition, obtainer 111 obtains the externally input correspondence between the drawing areas of display devices 10 (drawing area information) (S12). Obtainer 111 outputs, to management unit 111a, the obtained display device information on each of display devices 10 and the obtained correspondence between the drawing areas of display devices 10.

Management unit 111a manages the display device information on each of display devices 10 and the correspondence between the drawing areas of display devices 10, which have been output from obtainer 111, and the display positions, sizes, and display priority levels of application windows, and outputs the information items to calculator 112.

Calculator 112 obtains the display device information on each of display devices 10, the correspondence between the drawing areas of display devices 10, and the display positions, sizes, and display priority levels of the application windows, which have been output from management unit 111a, and calculates a correction value corresponding to each of display devices 10 on the basis of the obtained information items.

Specifically, calculator 112 calculates the first correction value corresponding to first display device 11 on the basis of the display device information on each of first display device 11 and second display device 12, and outputs the calculated first correction value to first display 114 of first controller 110. Calculator 112 calculates the second correction value corresponding to second display device 12 on the basis of the display device information on each of first display device 11 and second display device 12, and outputs the calculated second correction value to second display 124 of second controller 120.

More specifically, calculator 112 calculates first correction value A on first controller 110 side for preventing differences in the luminance and color tone from appearing between first display device 11 and second display device 12, and then outputs calculated first correction value A to first drawing unit 114a. Moreover, calculator 112 calculates second correction value A on second controller 120 for preventing differences in the luminance and color tone from appearing between first display device 11 and second display device 12, and then outputs calculated second correction value A to second drawing unit 124a (S13).

Calculator 112 calculates first correction value B on first controller 110 side for preventing differences in the size and resolution from appearing between first display device 11 and second display device 12, and then outputs calculated first correction value B to first synthesizer 114b. Here, first correction value B indicates the corrected display positions and sizes of the application windows. Moreover, calculator 112 calculates second correction value B on second controller 120 side in the same manner as first correction value B is calculated, and then outputs calculated second correction value B to second synthesizer 124b (S14).

Since the correction value in S13 is uniquely determined for each display device, step S13 just needs to be performed once at the time of initialization. However, since the correction value in S14 needs to be recalculated according to the change of the position and size of an application window, step S14 is performed per frame.

By first application 113 operating, command generator 113a generates a draw command for causing first display 114 and second display 124 to perform the drawing processing. Moreover, by second application 123 operating, command generator 123a generates a draw command for causing first display 114 and second display 124 to perform the drawing processing (S15).

Command generator 113a outputs the generated draw command to first display 114 and second display 124. Command generator 123a outputs the generated draw command to first display 114 and second display 124 (S16).

Each of first display 114 and second display 124 obtains the draw command from each of command generator 113a and command generator 123a (S17).

Display 104 performs the drawing processing and the synthesis processing which reflect the correction values, on the basis of the correction values corresponding to each of first display device 11 and second display device 12.

To display applications on first display device 11, specifically, in accordance with the draw commands obtained from the command generators and first correction value A, first drawing unit 114a of first display 114 performs the drawing processing (reflecting the correction value) for first application 113 and second application 123 to be displayed on first display device 11, the drawing processing being processing for adjusting, for example, the luminance (lightness), the contrast, the gamma value, and the color tone (S18).

In accordance with first correction value B output from calculator 112 and the display priority levels, first synthesizer 114b of first display 114 performs the cutout of the application windows drawn by first drawing unit 114a and the synthesis processing. Then, first synthesizer 114b outputs the first image to be displayed on first display device 11 to first frame memory 115 (S19).

To display the applications on second display device 12, specifically, in accordance with the draw commands obtained from the command generators and second correction value A, second drawing unit 124a of second display 124 performs the drawing processing (reflecting the correction value) for first application 113 and second application 123 to be displayed on second display device 12, the drawing processing being processing for adjusting, for example, the luminance (lightness), the contrast, the gamma value, and the color tone (S18).

In accordance with second correction value B output from calculator 112 and the display priority levels, second synthesizer 124b of second display 124 performs the cutout of the application windows drawn by second drawing unit 124a and the synthesis processing. Then, second synthesizer 124b outputs the second image to be displayed on second display device 12 to second frame memory 125 (S19).

The first image which has been corrected by first display 114 performing the drawing processing and the synthesis processing is written to first frame memory 115, and the second image which has been corrected by second display 124 performing the drawing processing and the synthesis processing is written to second frame memory 125 (S20).

The first image output from first frame memory 115 is displayed on the display screen of first display device 11, and the second image output from second frame memory 125 is displayed on the display screen of second display device 12 (S21).

After performing step S21, display control system 1 causes the processing to return to step S14 in the next frame. In this way, the drawing processing and the synthesis processing each reflecting the correction value are performed in each frame.

It should be noted that the processing in the flowchart illustrated in FIG. 3 is terminated, for example, by stopping processing operation of display control system 1 in FIG. 3 or by switching off display control system 1.

Figure 4:
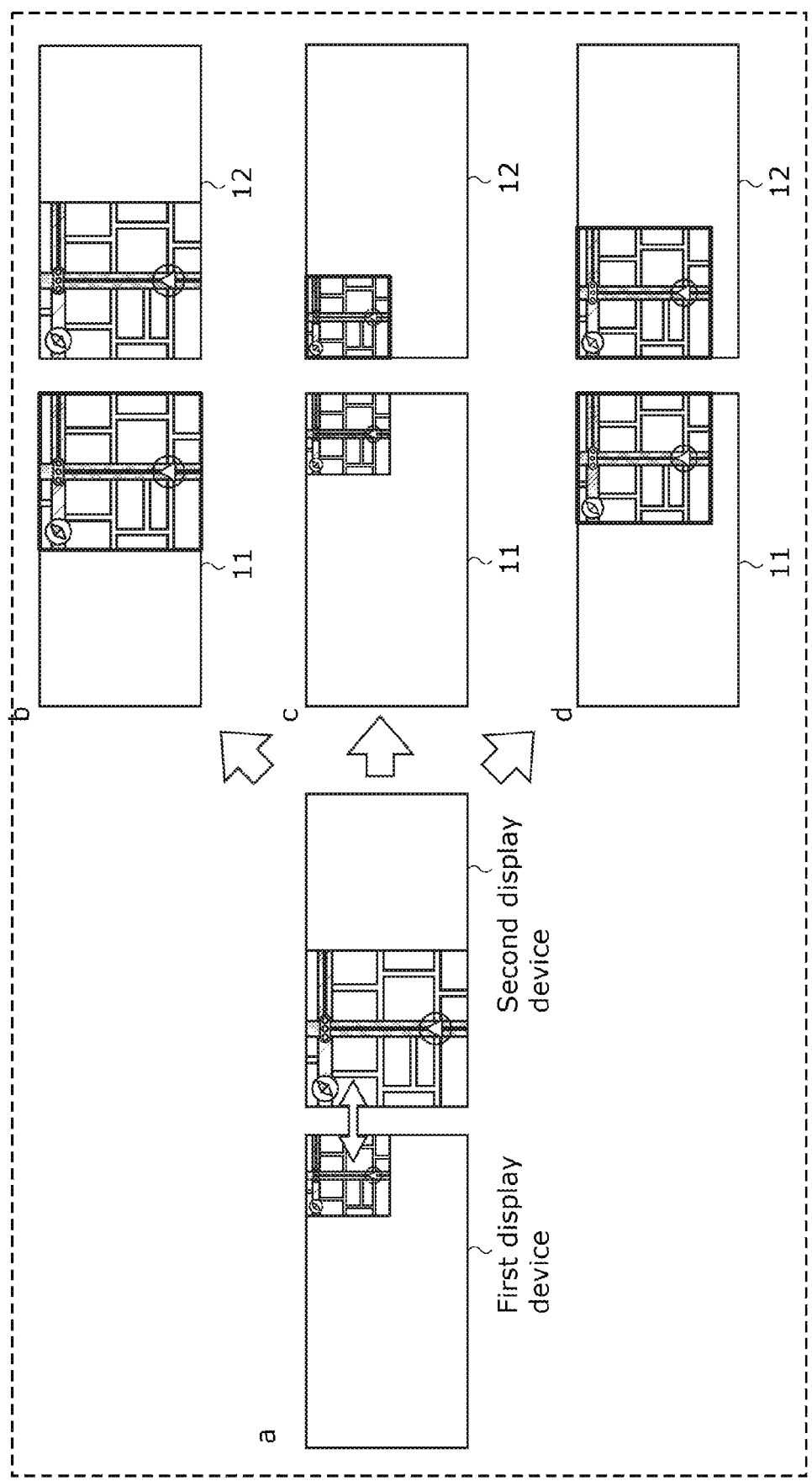
FIG. 4 illustrates examples in which the display control system according to the embodiment is causing each of display devices to display an image.

FIG. 4 illustrates an example in which images having an overall sense of unity are displayed by using display control system 1. FIG. 4 illustrates an example in which display control system 1 according to the embodiment is causing each of display devices 10 to display an image.

For instance, a in FIG. 4 illustrates an example in which the same application image is displayed on the first display device and the second display device which have the same physical size and different resolutions. Here, the first display device has a resolution of 1920×1080 (pixels), and the second display device has a resolution of 960×540 (pixels). In this case, when the same image is displayed across the first display device and the second display device, the size of the displayed image differs between the first display device and the second display device.

Even in the case of a in FIG. 4, display control system 1 according to the embodiment can adjust, as illustrated in b in FIG. 4, the size of the image displayed on first display device 11 to conform to that of the image displayed on second display device 12, by correcting the position and the size of the image displayed on first display device 11 and enlarging the image displayed on first display device 11. As in the case of c in FIG. 4, display control system 1 according to the embodiment can adjust the size of the image displayed on second display device 12 to conform to that of the image displayed on first display device 11, by correcting the position and the size of the image displayed on second display device 12 and reducing the image displayed on second display device 12. As in the case of d in FIG. 4, by enlarging the image displayed on first display device 11 and reducing the image displayed on second display device 12, display control system 1 according to the embodiment can adjust the size of the image displayed on first display device 11 and the size of the image displayed on second display device 12 to be identical.

Thus, when first display device 11 and second display device 12 are different display devices 10, on the basis of the correction values, display control system 1 corrects an image to reduce, for example, a physical size difference, a resolution difference, a luminance difference, and a color tone difference between first display device 11 and second display device 12. In this manner, display control system 1 can display images having an overall sense of unity as if two or more display devices 10 were, in their entirety, one display device 10.

<Effects>

Effects of display control system 1, the display method, and the program according to the embodiment are described below.

In conventional display control systems, a sense of unity in character sizes can be improved, whereas an overall sense of unity among display devices cannot be improved.

Meanwhile, as described above, display control system 1 according to the embodiment includes obtainer 111, calculator 112, and display 104. Obtainer 111 obtains display device information on each of display devices 10. Calculator 112 calculates a correction value corresponding to each of display devices 10 on the basis of the display device information. Display 104 generates an image to be displayed across two or more display devices 10 among display devices 10. Display 104 corrects the image to be displayed across two or more display devices 10 on the basis of the correction value corresponding to each of two or more display devices 10 and displays, across two or more display devices 10, the corrected image.

Figure 5:
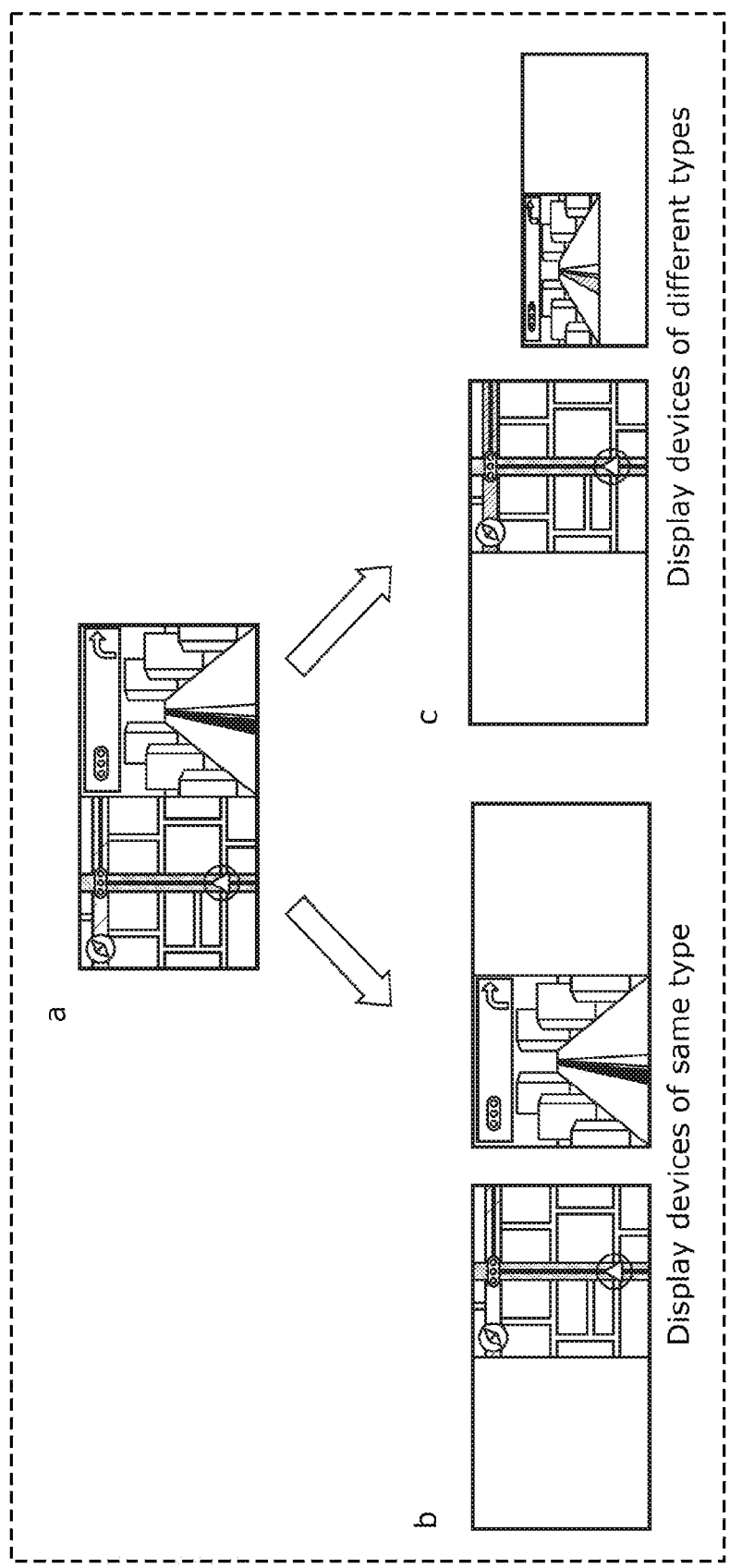
FIG. 5 illustrates an example in which images are displayed on display devices without a sense of unity.

For instance, in a conventional display control system, when images are displayed on display devices of different types, the images are displayed as illustrated in FIG. 5. FIG. 5 illustrates an example in which images are displayed on display devices without a sense of unity. In a in FIG. 5, an example in which one display is displaying two images (which may be referred to as the first image and the second image) is illustrated. Consider the case in which the two images illustrated in a in FIG. 5 are displayed across two display devices (which may be referred to as the first display device and the second display device). In this case, as illustrated in b in FIG. 5, when the two display devices are the same type and the same settings are set to the two display devices, the resolution, the image size, the aspect ratio, the luminance, the color tone, and other aspects of the first image displayed on the first display device are similar to those of the second image displayed on the second display device.

However, when the two images are displayed on respective display devices of different types, the resolution, the image size, the aspect ratio, the luminance, the color tone, and other aspects of the first image displayed on the first display device may differ from those of the second image displayed on the second display device.

Meanwhile, in the embodiment, to display on two or more display devices 10, it is possible to perform corrections suitable for respective images on the basis of correction values corresponding to each of two or more display devices 10. Thus, for example, as illustrated in b, c, and, d in FIG. 4, the corrected images are displayed across two or more display devices 10.

Thus, display control system 1 can achieve displaying with an overall sense of unity among display devices 10. This can suppress the driver's visibility of display devices 10 from decreasing.

The display method according to the embodiment includes obtaining display device information on each of display devices 10, calculating a correction value corresponding to each of display devices 10 on the basis of the display device information, generating an image to be displayed across two or more display devices 10 among display devices 10, correcting the image to be displayed across two or more display devices 10, on the basis of the correction value corresponding to each of two or more display devices 10, and displaying, across two or more display devices 10, the image corrected is displayed.

The display method also provides effects similar to those described above.

A program according the embodiment is a program to be executed by a computer.

The program also provides effects similar to those described above.

In addition, in display control system 1 according to the embodiment, calculator 112 calculates a correction value to prevent a difference from appearing between portions of the image when the image is displayed across two or more display devices 10, the portions of the image each being displayed on a different one of two or more display devices 10.

Thus, it is possible to achieve displaying with a greater overall sense of unity among display devices 10. Thus, when the occupant looks at display devices 10 in their entirety, the occupant does not experience discomfort about the displayed images. Accordingly, the visibility of the images improves.

In display control system 1 according to the embodiment, the display device information includes at least one of the physical size, resolution, luminance, and color tone of display device 10. Obtainer 111 obtains the display device information automatically from each of display devices 10 or by the display device information being externally input.

Thus, even if there is display device 10 from which the display device information cannot be obtained automatically, obtainer 111 can obtain the display device information on aforementioned display device 10. Thus, even if display devices 10 are different types of display devices, it is possible to achieve displaying with an overall sense of unity among display devices 10.

In addition, the display device information on display device which has been automatically obtained can be modified. Thus, even if there is a subtle difference between display devices 10, a correction value can be generated in consideration of the difference. Accordingly, display control system 1 can achieve displaying with a greater overall sense of unity among display devices 10.

In display control system 1 according to the embodiment, two or more display devices 10 include first display device 11 and second display device 12. Display 104 includes first display 114 corresponding to first display device 11 and second display 124 corresponding to second display device 12. Calculator 112 calculates a first correction value corresponding to first display device 11 on the basis of the display device information on each of first display device 11 and second display device 12. Calculator 112 calculates a second correction value corresponding to second display device 12 on the basis of the display device information on each of first display device 11 and second display device 12. First display 114, in order to display on first display device 11, corrects a first image on the basis of the first correction value corresponding to first display device 11. Second display 124, in order to display on second display device 12, corrects a second image on the basis of the second correction value corresponding to second display device 12. First display 114 displays the corrected first image on first display device 11. Second display 124 displays the corrected second image on second display device 12.

Thus, when first display device 11 and second display device 12 are different display devices 10, it is possible to calculate the first correction value corresponding to first display device 11 and the second correction value corresponding to second display device 12. Accordingly, it is possible to achieve displaying with an overall sense of unity between first display device 11 and second display device 12.

Variation 1 of Embodiment

In Variation 1, display control system 1a does not include a command generator. A first display is first drawing unit 114a (the first display is an example of first drawing unit 114a). A second display is second drawing unit 124a (the second display is an example of second drawing unit 124a). In these respects, display control system 1a differs from the display control system according to the embodiment. Unless otherwise stated, the others described in Variation 1 are similar to these described in the embodiment. Identical elements in Variation 1 and the embodiment are assigned the same reference symbol, and detailed explanations for the identical elements are omitted.

<Processing Operation>

Figure 6:
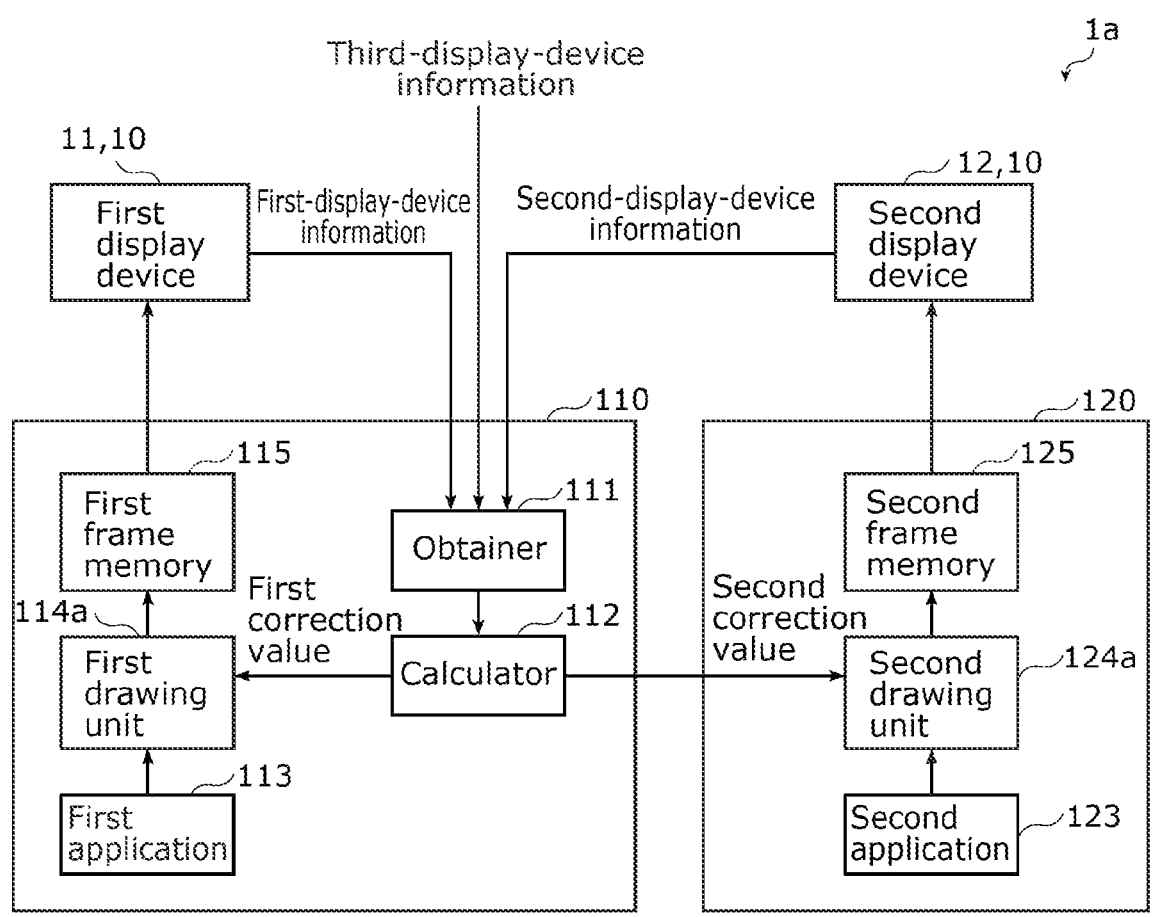
FIG. 6 is a block diagram illustrating a configuration example of a display control system according to Variation 1 of the embodiment.
Figure 7:
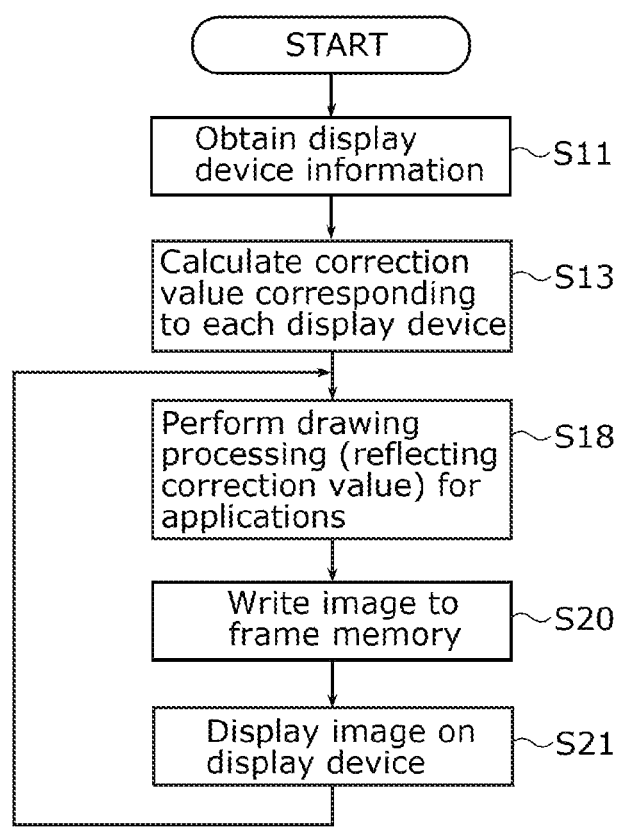
FIG. 7 is a flowchart illustrating processing operation of the display control system according to Variation 1 of the embodiment.

Processing operation in display control system 1a, a display method, and a program according to Variation 1 of the embodiment is described with reference to FIGS. 6 and 7. FIG. 6 is a block diagram illustrating a configuration example of display control system 1a according to Variation 1 of the embodiment. FIG. 7 is a flowchart illustrating processing operation of display control system 1a according to Variation 1 of the embodiment. The identical steps illustrated in FIG. 7 and FIG. 3 are assigned the same reference symbol, and explanations for the steps are omitted where appropriate.

Obtainer 111 obtains display device information automatically from each of display devices 10 or by the display device information being externally input (S11). Obtainer 111 outputs the obtained display device information on each of display devices 10 to calculator 112.

Calculator 112 obtains the display device information on each of display devices 10 output from obtainer 111 and calculates a correction value corresponding to each of display devices 10 on the basis of the obtained display device information on each display device 10 (S13).

First drawing unit 114a performs drawing processing for adjusting, for example, the luminance (lightness), the contrast, the gamma value, and the color tone on the basis of a draw command obtained from first application 113 and a first correction value obtained from calculator 112 (S18). Second drawing unit 124a performs the drawing processing for adjusting, for example, the luminance (lightness), the contrast, the gamma value, and the color tone on the basis of a draw command obtained from second application 123 and a second correction value obtained from calculator 112 (S18).

A first image corrected by first drawing unit 114a performing the drawing processing is written to first frame memory 115, and a second image corrected by second drawing unit 124a performing the drawing processing is written to second frame memory 125 (S20).

The first image output from first frame memory 115 is displayed on the display screen of first display device 11, and the second image output from second frame memory 125 is displayed on the display screen of second display device 12 (S21).

After performing step S21, display control system 1a causes the processing to return to step S18 in the next frame. In this way, display control system 1a performs, in each frame, the drawing processing reflecting the correction value.

Variation 1 provides effects similar to those described above.

Variation 2 of Embodiment

In Variation 2, the size of an image is changed according the traveling speed of vehicle 2. In this and other respects, a display control system according to Variation 2 differs from the display control system according to the embodiment. Unless otherwise stated, the others described in Variation 2 are similar to these described in the embodiment. Identical elements in Variation 2 and the embodiment are assigned the same reference symbol, and detailed explanations for the identical elements are omitted.

A speed sensor (not illustrated) is mounted on vehicle 2 on which display control system 1 is mounted. The speed sensor detects the traveling speed of vehicle 2 at predetermined time intervals and outputs, as a result of detection, vehicle speed information indicating the traveling speed of vehicle 2.

Obtainer 111 obtains the vehicle speed information output by the speed sensor, the vehicle speed information indicating the traveling speed of vehicle 2. Obtainer 111 outputs the obtained vehicle speed information to calculator 112.

To change the size of an image displayed across two or more display devices 10, calculator 112 changes a calculated correction value according to the traveling speed of vehicle 2 indicated in the vehicle speed information. Specifically, calculator 112 changes the calculated correction value to increase the size of the image with an increase of the traveling speed of vehicle 2 indicated in vehicle speed information, the image being displayed across two or more display devices 10. For instance, in display control system 1, not only the size of the image but also the size of, for example, a character displayed on each of display devices 10 may be increased with an increase in the traveling speed of the vehicle. Not only the size of the image but also the size of, for example, a character displayed on each of the display devices may be decreased with a decrease of the traveling speed of the vehicle.

Display control system 1 according to Variation 2 is mounted on vehicle 2. Obtainer 111 obtains the vehicle speed information indicating the traveling speed of vehicle 2. To change the size of the image displayed across two or more display devices 10, calculator 112 changes the calculated correction value according to the traveling speed of vehicle 2 indicated in the vehicle speed information.

Thus, it is possible to change the size of the image according to the traveling speed of vehicle 2, which improves the occupant's visibility of the image displayed across display devices 10.

In display control system 1 according to Variation 2, calculator 112 changes the calculated correction value to increase the size of the image with an increase of the traveling speed of vehicle 2 indicated in vehicle speed information, the image being displayed across two or more display devices 10.

Thus, it is possible to increase the size of the image with an increase in the traveling speed of vehicle 2, which facilitates recognition of information indicated in the image by the occupant, especially by a driver.

Variation 2 also provides effects similar to those described above.

Variation 3 of Embodiment

In Variation 3, the size of an image is changed by switching between an autonomous driving mode and a manual driving mode. In this and other respects, a display control system according to Variation 3 differs from the display control system according to the embodiment. Unless otherwise stated, the others described in Variation 3 are similar to these described in the embodiment. Identical elements in Variation 3 and the embodiment are assigned the same reference symbol, and detailed explanations for the identical elements are omitted.

Vehicle 2 has the function of driving in the autonomous driving mode and the function of driving in the manual driving mode and is switchable between the autonomous driving mode and the manual driving mode. In the autonomous driving mode, vehicle 2 can autonomously travel in accordance with traveling data. In the manual driving mode, manual operation of vehicle 2 by an occupant can cause vehicle 2 to travel.

Obtainer 111 obtains, from, for example, an ECU mounted on vehicle 2, vehicle mode information indicating whether vehicle 2 is in the autonomous driving mode or in the manual driving mode.

Obtainer 111 outputs the obtained vehicle mode information to calculator 112.

Calculator 112 changes a calculated correction value to cause the size of the image to differ according to the mode of vehicle 2 indicated in the vehicle mode information, that is, according to whether vehicle 2 is in the autonomous driving mode or in the manual driving mode, the image being displayed across two or more display devices 10. Specifically, calculator 112 changes the calculated correction value to cause the image displayed when vehicle 2 is in the autonomous driving mode to be smaller than the image displayed when vehicle 2 is in the manual driving mode, the image being displayed across two or more display devices 10. It should be noted that in display control system 1, not only the size of the image but also the size of, for example, a character displayed on each of display devices may be larger when the vehicle is in the manual driving mode. Not only the size of the image but also the size of, for example, a character displayed on each of the display devices may be smaller when the vehicle is in the autonomous driving mode.

Display control system 1 according to Variation 3 is mounted on vehicle 2. Vehicle 2 is switchable between the autonomous driving mode and the manual driving mode. Calculator 112 changes the calculated correction value to cause the size of the image to differ according to whether vehicle 2 is in the autonomous driving mode or in the manual driving mode, the image being displayed across two or more display devices 10.

Thus, it is possible to change the size of the image according to whether the vehicle is in the autonomous driving mode or in the manual driving mode, which improves the occupant's visibility of the image displayed across display devices 10.

In display control system 1 according to Variation 3, calculator 112 changes the calculated correction value to cause the image displayed when vehicle 2 is in the autonomous driving mode to be smaller than the image displayed when vehicle 2 is in the manual driving mode, the image being displayed across two or more display devices 10.

Thus, the size of the image displayed across display devices 10 when the vehicle is in the manual driving mode is large, which improves the occupant's visibility of the image displayed across display devices 10 and facilitates recognition of information indicated in the image especially by the driver.

Variation 3 also provides effects similar to those described above.

Variation 4 of Embodiment

In Variation 4, the size of an image is changed according the ambient brightness inside the occupant compartment of a vehicle. In this and other respects, a display control system according to Variation 4 differs from the display control system according to the embodiment. Unless otherwise stated, the others described in Variation 4 are similar to these described in the embodiment. Identical elements in Variation 4 and the embodiment are assigned the same reference symbol, and detailed explanations for the identical elements are omitted.

A brightness sensor (not illustrated) is mounted on vehicle 2 on which display control system 1 is mounted. The brightness sensor detects the brightness inside the occupant compartment of vehicle 2 at predetermined time intervals and outputs, as a result of detection, brightness information indicating the ambient brightness inside the occupant compartment of vehicle 2.

Obtainer 111 obtains the brightness information output by the brightness sensor, the brightness information indicating the brightness around display control system 1 (the brightness inside the occupant compartment). Obtainer 111 outputs the obtained brightness information to calculator 112.

To change the luminance of a corrected image displayed across two or more display devices 10, calculator 112 changes a calculated correction value according to the brightness around display control system 1 indicated in the brightness information. Specifically, calculator 112 changes the calculated correction value to increase the luminance of the image with an increase of the brightness inside the occupant compartment of vehicle 2 indicated in brightness information, the image being displayed across two or more display devices 10.

It should be noted that in display control system 1, not only the size of the image but also the size of, for example, a character displayed on each of display devices may be changed according to the brightness inside the occupant compartment of vehicle 2 (the brightness depends on and off of an interior light, the weather, the place, and other factors). In display control system 1, the size of, for example, a character displayed on each of the display devices may be reduced with an increase in the brightness inside the occupant compartment of vehicle 2. The size of, for example, the character displayed on each of the display devices may be increased with a decrease in the brightness inside the occupant compartment of vehicle 2. It should be noted that in display control system 1, not only the size of an image but also the size of, for example, a character may be appropriately changed according to the ambient environment including the ambient brightness and the brightness that depends on the weather, the place, and other factors.

In display control system 1 according to Variation 4, obtainer 111 obtains the brightness information indicating the brightness around display control system 1. To change the luminance of the corrected image displayed across two or more display devices 10, calculator 112 changes the calculated correction value according to the brightness information around display control system 1 indicated in the brightness information.

Thus, it is possible to change the luminance of the image displayed across display devices 10 according to the brightness inside the occupant compartment, which improves the occupant's visibility of the image displayed across display devices 10.

Variation 4 also provides effects similar to those described above.

Other Variations

The display control system, the display method, and the program according to the present disclosure are described on the basis of the embodiment. However, the present disclosure is not limited to the descriptions in the embodiment. The present disclosure may include, within the spirit of the present disclosure, one or more embodiments obtained by making various changes envisioned by those skilled in the art to the above embodiment.

For instance, in the display control system, the display method, and the program according to the present disclosure, to change the size of a character displayed on each of two or more display devices, the display may change a calculated correction value according to at least one of the traveling speed of a vehicle, the mode of the vehicle, and brightness around the display control system, the mode of the vehicle indicating the autonomous driving mode or the manual driving mode. Thus, the character whose size has been appropriately changed according to the traveling speed of the vehicle, the mode of the vehicle, the brightness around the display control system, or other factors, can be displayed on each of the two or more display devices. This improves the occupant's visibility of the character displayed on each of display devices 10.

In addition, elements included in the display control system, the display method, and the program according to the embodiment are typically embodied as large-scale integrations (LSIs), which are integrated circuits. The elements of a display control device may be made as individual chips, or a part or all of the elements may be incorporated into one chip.

In addition, circuit integration is achieved not only by an LSI but also by a dedicated circuit or a general-purpose processor. A field programmable gate array (FPGA) which can be programmed after manufacturing an LSI or a reconfigurable processor in which the connections and settings of circuit cells inside an LSI are reconfigurable may be used.

It should be noted that in the embodiment, each of the structural elements may be dedicated hardware or may be caused to function by executing a software program suitable for the structural element. The structural element may be caused to function by a program executer, such as a CPU or a processor, reading and executing a software program stored in a recording medium, such as a hard disk or semiconductor memory.

In addition, all the numbers used in the above descriptions are provided as examples to specifically explain the present disclosure. In the embodiment of the present disclosure, the numbers are provided for purposes of illustration and not limitation.

In addition, the configuration of the functional blocks illustrated in the block diagram is a mere example. Two or more functional blocks may be incorporated into one functional block. One functional block may be divided into more than one functional block. A part of the function may be transferred from one functional block to another functional block. The same hardware or software may process, in parallel or on a time-sharing basis, the functions of two or more functional blocks having similar functions.

In addition, the order in which the steps in the flowchart are performed is provided as an example to specifically explain the present disclosure. The steps may be performed in a different order. In addition, a part of the steps and another step may be performed simultaneously (in parallel).

While the embodiment has been described herein above, it is to be appreciated that various changes in form and detail may be made without departing from the spirit and scope of the present disclosure as presently or hereafter claimed. It should be noted that the present disclosure includes one or more embodiments obtained by making various changes envisioned by those skilled in the art to the embodiment and one or more embodiments achieved by any combination of the structural elements and the functions described in the embodiment within the scope of the present disclosure.

Further Information about Technical Background to this Application

The disclosures of the following patent applications including specification, drawings, and claims are incorporated herein by reference in their entirety: Japanese Patent Application No. 2021-060039 filed on Mar. 31, 2021 and PCT International Application No. PCT/JP2022/003422 filed on Jan. 28, 2022.

INDUSTRIAL APPLICABILITY

The present disclosure can be used in, for example, a vehicle on which display devices are mounted and a device and a system other than the vehicle.

The invention claimed is:

1. A display control system comprising:
a processor; and
a memory including at least set of instructions that, when executed by the processor, causes the processor to perform operations, the operations including:
obtaining:
first display device information and second display device information on each of a first display device and a second display device included in a plurality of display devices, the second display device being different in at least one of physical size or resolution from the first display device, and
brightness information indicating brightness around the display control system;
calculating, based on the first display device information and the second display device information, a first correction value corresponding the first display device and a second correction value corresponding to the second display device different from the first correction value, wherein to change luminance of the images displayed on the two or more display devices, the calculating further includes changing the correction values calculated, according to the brightness around the display control system indicated in the brightness information;
generating images to be displayed on the first display device and the second display device, correcting the images to be displayed on the first display device and the second display device, respectively, based on the first correction value corresponding to the first display device and the second correction value corresponding to the second display device; and
respectively displaying, using the first correction value and the second correction value calculated based on the first display device information and the second display device information, the corrected images on the first display device and the second display device, such that a position and a size of one of the first image displayed on the first display device and the second image displayed on the second display device matches the position and the size of the other of the first image displayed on the first display device and the second image displayed on the second display device.

2. The display control system according to claim 1, wherein the first display device information and the second display device information each includes at least one of a physical size, a resolution, luminance, or a color tone of the display device, and
the obtaining further includes obtaining the first display device information and the second display device information automatically from each of the first display device and the second display device or by the first display device information and the second display device information being externally input.

3. The display control system according to claim 1, wherein the generated images include a first image and a second image,
wherein the correcting includes correcting, in order to display on the first display device, the first image based on the first correction value corresponding to the first display device,
wherein the correcting further includes correcting, in order to display on the second display device, the second image based on the second correction value corresponding to the second display device,
wherein the displaying includes displaying, on the first display device, the first image corrected, and
wherein the displaying further includes displaying, on the second display device, the second image corrected.

4. The display control system according to claim 1, wherein
the display control system is mounted on a vehicle,
the obtaining further includes obtaining vehicle speed information indicating a traveling speed of the vehicle, and
to change a size of the images displayed on the two or more display devices, the calculating further includes changing the correction values calculated, according to the traveling speed of the vehicle indicated in the vehicle speed information.

5. The display control system according to claim 4, wherein the calculating further includes changing the correction values calculated, to increase the size of the images with an increase in the traveling speed of the vehicle indicated in the vehicle speed information, the images being displayed on the first display device and the second display device.

6. The display control system according to claim 1, wherein
the display control system is mounted on a vehicle,
the vehicle is switchable between an autonomous driving mode and a manual driving mode, and
the calculating further includes changing the correction values calculated, to cause a size of the images to differ according to whether the vehicle is in the autonomous driving mode or in the manual driving mode, the images being displayed on the first display device and the second display device.

7. The display control system according to claim 6, wherein the calculating further includes changing the correction values calculated, to cause the images displayed when the vehicle is in the autonomous driving mode to be smaller than the images displayed when the vehicle is in the manual driving mode, the images being displayed on the first display device and the second display device.

8. The display control system according to claim 1, wherein to change a size of a character displayed on each of the first display device and the second display device, the calculating further includes changing the correction values calculated, according to at least one of a traveling speed of a vehicle, a mode of the vehicle, or brightness around the display control system, the mode of the vehicle indicating an autonomous driving mode or a manual driving mode.

9. A display method comprising:
obtaining:
first display device information and second display device information on each of a respective first display device and a second display device included in a plurality of display devices, the second display device being different in at least one of physical size or resolution from the first display device, and
brightness information indicating brightness around the display control system;
calculating, based on the first display device information and the second display device information, a first correction value corresponding to the first display device and a second correction value corresponding to the second display device different from the first correction value, wherein to change luminance of the images displayed on the two or more display devices, the calculating further includes changing the correction values calculated, according to the brightness around the display control system indicated in the brightness information;
generating images to be on the first display device and the second display device;
correcting the images to be displayed on the first display device and the second display device, respectively, based on the first correction value corresponding the first display device and the second correction value corresponding to the second display device; and
displaying, using the first correction value and the second correction value calculated based on physical sizes and resolutions of the first display device and the second display device, the corrected images on the first display device and the second display device, such that a position and a size of one of the first image displayed on the first display device and the second image displayed on the second display device matches the position and the size of the other of the first image displayed on the first display device and the second image displayed on the second display device.

10. A non-transitory computer-readable recording medium having recorded thereon a program for causing a computer to execute the display method according to claim 9.

* * * * *